United States Patent
Bi et al.

(10) Patent No.: US 10,593,362 B2
(45) Date of Patent: *Mar. 17, 2020

(54) INTERLACED MAGNETIC RECORDING STORAGE SYSTEM

(71) Applicant: Seagate Technology LLC, Cupertino, CA (US)

(72) Inventors: Qiang Bi, Singapore (SG); Kian Keong Ooi, Singapore (SG); Christopher M. Woldemar, Singapore (SG); ShihMing Lau, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/676,550

(22) Filed: Aug. 14, 2017

(65) Prior Publication Data

US 2019/0051329 A1    Feb. 14, 2019

(51) Int. Cl.
*G11B 20/18* (2006.01)
*G06F 12/0866* (2016.01)
*G06F 11/07* (2006.01)
*G11B 20/12* (2006.01)

(52) U.S. Cl.
CPC .......... *G11B 20/18* (2013.01); *G06F 11/076* (2013.01); *G06F 11/0727* (2013.01); *G06F 11/0793* (2013.01); *G06F 12/0866* (2013.01); *G11B 20/1217* (2013.01); *G06F 2212/1032* (2013.01); *G06F 2212/224* (2013.01); *G11B 2020/1238* (2013.01); *G11B 2020/1292* (2013.01); *G11B 2020/183* (2013.01); *G11B 2020/1869* (2013.01)

(58) Field of Classification Search
CPC ............ G11B 20/18; G11B 2020/1869; G11B 2020/1238; G11B 2020/1292; G11B 2020/183; G11B 20/1217; G06F 12/0866; G06F 11/0727; G06F 11/076; G06F 11/0793; G06F 2212/1032; G06F 2212/224

See application file for complete search history.

(56) References Cited

U.S. PATENT DOCUMENTS

| | | | |
|---|---|---|---|
| 6,583,965 B1 | 6/2003 | Forbord et al. | |
| 6,646,826 B1 | 11/2003 | Haidari et al. | |
| 9,437,240 B1 | 9/2016 | Haddock | |
| 9,972,353 B1 * | 5/2018 | Qiang | G11B 20/1217 |

(Continued)

*Primary Examiner* — Guy J Lamarre
(74) *Attorney, Agent, or Firm* — Holzer Patel Drennan

(57) ABSTRACT

The disclosed technology provides a system and method that improves interlaced magnetic recording (IMR) data throughput in vibration in storage systems. In one implementation, a method includes determining whether there are write retry operations in the IMR storage device, determining whether bottom track caching space is available responsive to determining whether there are write retry operations in the IMR storage device, performing a vibration detection scheme to identify vibration events responsive to determining whether bottom track caching space is available, determining if a number of vibration events is above a predetermined threshold, and writing data to available bottom track caching space responsive to determining if the number of vibration events is above a predetermined threshold.

16 Claims, 6 Drawing Sheets

(56) References Cited

U.S. PATENT DOCUMENTS

| | | | |
|---|---|---|---|
| 2009/0164843 A1* | 6/2009 | Wei | G06F 11/1441 714/15 |
| 2009/0244754 A1* | 10/2009 | Sato | G11B 20/10527 360/31 |
| 2012/0176698 A1 | 7/2012 | Rub | |
| 2015/0269081 A1* | 9/2015 | Shu | G06F 12/0868 369/53.42 |
| 2015/0279395 A1* | 10/2015 | Kim | G11B 5/5582 360/78.08 |
| 2018/0322902 A1* | 11/2018 | Qiang | G11B 20/1217 |

* cited by examiner

INTERLACED MAGNETIC RECORDING STORAGE SYSTEM

BACKGROUND

As requirements for data storage density increase for magnetic media, cell size decreases. A commensurate decrease in the size of a writer is difficult because in many systems, a strong write field is needed to switch the polarity of cells on a magnetized medium. As a result, writing data to smaller cells on the magnetized medium using the relatively larger write pole may affect the polarization of adjacent cells (e.g., overwriting the adjacent cells). Various recording techniques have been developed to enable gains in areal density capability without significant corresponding decreases in device performance.

One such recording technique is interlaced magnetic recording (IMR). IMR systems may utilize two or more selected written track widths and two or more different linear densities for data writes to alternating data tracks on a storage medium. In these systems, data tracks may be read from or written to the data tracks in a non-consecutive order. For example, data may be written exclusively to a first track series including every other data track in a region of a storage medium before data is written to any data tracks interlaced between the tracks of the first series.

BRIEF DESCRIPTIONS OF THE DRAWINGS

SUMMARY

Figure 1:
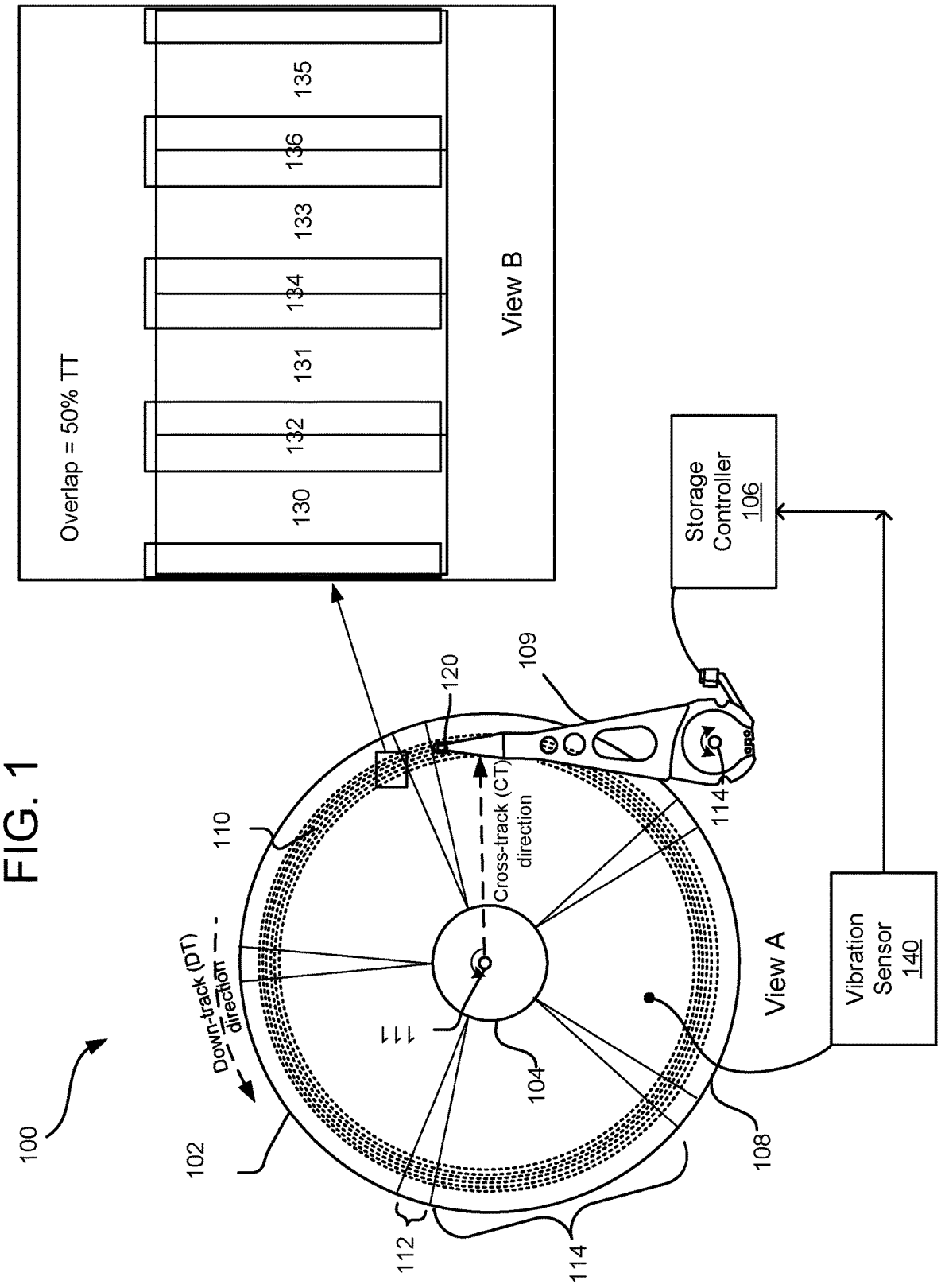
FIG. 1 illustrates an example disc drive assembly in an interlaced magnetic recording (IMR) storage system.

Implementations disclosed herein provide for a system and method that improves IMR data throughput in vibration in storage systems. In one implementation, a method includes determining whether there are write retry operations in the IMR storage device, determining whether bottom track caching space is available responsive to determining whether there are write retry operations in the IMR storage device, performing a vibration detection scheme to identify vibration events responsive to determining whether bottom track caching space is available, determining if a number of vibration events is above a predetermined threshold, and writing data to available bottom track caching space responsive to determining whether the number of vibration events is above a predetermined threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

The present disclosure is directed to data storage systems and methods that improve interlaced magnetic recording (IMR) data throughput in the presence of disturbance. If a disturbance occurs while data is being written to the top tracks of an IMR storage medium, data may be recorded incorrectly or become corrupted. As used herein, the term "disturbance" refers to changes affecting an environment within a storage device including, for example, vibration. A disturbance may be caused by forces external or internal to the storage device.

Disturbances such as impact shock and vibration can be a cause of problems in hard drive disc systems, particularly during write operations. If a disturbance occurs while data is being written to a storage medium, a write element may be knocked off of a target data track. As a result, data may be recorded incorrectly or become corrupted. Disturbances may be caused by a variety of forces, such as a user playing loud music from a laptop computer, vibrations due to cooling fans turning on or off, or external impact forces absorbed by an electronic device.

In these types of systems, a write operation affected by a disturbance can be retried until the write succeeds. However, write retries are time consuming, and may take a full spin period or revolution time of a magnetic media in the storage medium. If the frequency of disturbance-related write errors is large, data throughput performance can decrease.

The disclosed method includes writing data to top tracks of an IMR storage device, determining whether there are write retry operations in the IMR storage device, determining whether bottom track caching space is available, performing a vibration detection scheme to identify vibration events, determining if a number of vibration events is above a predetermined threshold, and writing data to available bottom track caching space.

In some implementations of the disclosed technology, the bottom tracks may have a relaxed on-cylinder (OCLIM) or off-track limit. A writer may write to a data track when the position error signal (PES) is smaller than or equal to the OCLIM. In the disclosed technology, the OCLIM of a bottom track may be relaxed to an amount approximately 25-50% of a top track in an IMR storage device. In some implementations, the OCLIM of a bottom track may be less than 25% or greater than 50%. The larger, "relaxed" OCLIM of the bottom tracks in the disclosed technology facilitates caching space.

In the following description, reference is made to the accompanying drawing that forms a part hereof and in which are shown by way of illustration at least one specific embodiment. In the drawing, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a plan view of an example disc drive assembly 100 in an IMR storage system. The disc drive assembly 100 includes a transducer head assembly 120 with a writer and reader (not shown) for writing and reading data to and from a magnetic storage medium 108. Transducer head assembly may include a number of reader and writer configurations such as HAMR, multiple read and/or write heads, etc. Although other implementations are contemplated, the magnetic storage medium 108 is, in FIG. 1, a magnetic storage disc on which data bits can be recorded using a magnetic write pole and from which data bits can be read using a magnetoresistive element (not shown).

As illustrated in View A, the magnetic storage medium 108 rotates about a spindle center or a disc axis of rotation 111 during rotation, and includes an inner diameter 104 and an outer diameter 102 between which are a number of concentric data tracks 110. Information may be written to and read from data bit locations in the data tracks on the magnetic storage medium 108.

The magnetic storage medium 108 is includes a number of servo sectors (e.g., a servo sector 112) extending radially between the inter diameter 104 and the outer diameter 102. In one implementation, each of the servo sectors (e.g., servo sector 112) includes embedded information used for track seeking and track following. In particular, the information includes fine head position information used for centerline tracking. Between every two consecutive servo sectors (e.g., servo sector 112) is a wedge (e.g., a wedge 114) that includes multiple sectors (e.g., data sectors and super parity sectors, not shown) of concentric data tracks 110.

The transducer head assembly 120 is mounted on an actuator assembly 109 at an end distal to an actuator axis of rotation 114. The transducer head assembly 120 flies in close proximity above the surface of the magnetic storage medium 108 during disc rotation. The actuator assembly 109 rotates during a seek operation about the actuator axis of rotation 112. The seek operation positions the transducer head assembly 120 over a target data track for read and write operations.

The storage device 100 further includes a storage controller 106. The storage controller 106 includes software and/or hardware, and may be implemented in any tangible processor-readable storage media within or communicatively coupled to the storage device 100.

The term "tangible processor-readable storage media" includes, but is not limited to, RAM, ROM EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a processor. In contrast to tangible processor-readable storage media, intangible processor readable communication signals may embody processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

View B illustrates a magnified view of a section of the magnetic storage medium 108 including data tracks (e.g., data tracks 130, 131, and 132) storing data according to an interlaced magnetic recording (IMR) technique.

The illustrated IMR technique utilizes alternating data tracks of different written track widths arranged with slightly overlapping written track boundaries so that a center-to-center distance between directly adjacent tracks (e.g., the track pitch) is uniform across an area (e.g., a radial zone or across an entire surface of the magnetic storage medium 108). Specifically, View B illustrates a first series of alternating tracks (e.g., the tracks 130, 131, 133, and 135) with a wider written track width than a second series of alternating data tracks (e.g., the tracks 132, 134, and 136). The first series of alternating tracks (tracks 130, 131, 133, and 135) are bottom tracks, and the second series of alternating tracks (tracks 132, 134, and 136) are top tracks.

In some implementations, in a normal writing sequence, each wide data track (i.e., bottom track) of the first series is written before the data is written to any directly-adjacent data tracks (i.e., top tracks) of the second series. For example, the data track 131 is written before data is written to data track 132. Data writes to the data tracks 132 and 134 may subsequently overwrite outer edge portions of the data track 131; however, the data track 131 is still readable due to sufficient information retained in a center region of the data track 131.

In FIG. 1, the disclosed magnetic storage medium 108 improves IMR data throughput when there is vibration. In one implementation, if write retry operations are identified, the storage controller determines whether caching space is available in the bottom tracks. In some implementations, the OCLIM of a bottom track may be relaxed by approximately 25-50% of a top first track. Thus, there may be adequate space in the bottom track to be used as caching space.

In one implementation, the storage controller 106 determines if there are any write retry operations performed while writing data to the top tracks. If there are any write retry operations while writing data to the top tracks, the storage controller 106 determines if any caching space is available on the bottom tracks. In response to determining that there is caching space available, the storage controller 106 performs a vibration detection scheme to identify vibration events. For example, the storage controller 106 may determine the number of vibrations per sec, etc. Specifically, a vibration sensor 140 is configured to detect vibration and communicate signals to the storage controller 106. In FIG. 1, the vibration sensor 140 may located on the magnetic storage medium 108 or on a chassis of the storage device 100. In some implementations, the vibration sensor 140 may be located on other components.

If the storage controller 106 determines that the a number of vibration events is above a predetermined threshold, the storage controller 106 is configured to write data to caching space in the bottom tracks in the IMR storage device. For example, a predetermined threshold could be one or more vibration events per a unit time period. As a result, using due to the relaxed OCLIM in the bottom tracks and/or the method of saving data to available caching space in the bottom tracks, data throughput performance in the IMR storage device system can increase.

Figure 2:
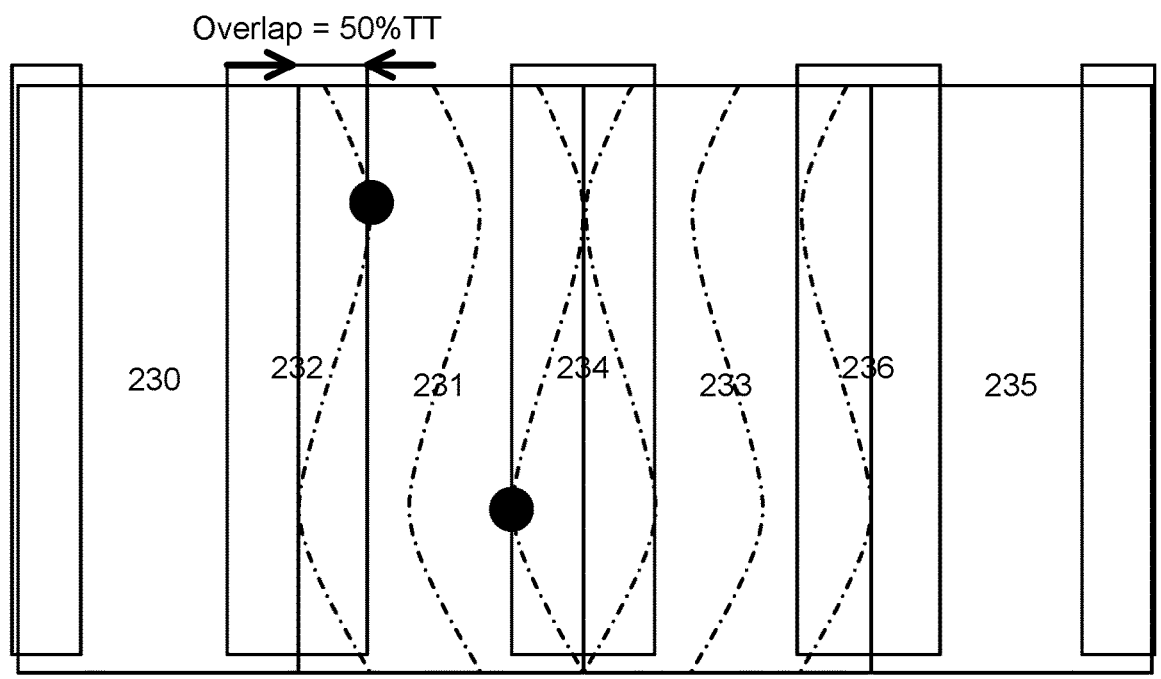
FIG. 2 is a schematic diagram of an example data tracks in an IMR storage system.

FIG. 2 is a schematic diagram of an example data tracks 200 in an IMR storage system. The data tracks (e.g., top tracks 232, 234, and 236 and bottom tracks 230, 231, 233, and 235) are shown with an increased OCLIM on the bottom tracks. Specifically, as depicted in FIG. 2, the OCLIM of bottom track 231 overlaps 50% of top track 232.

In some implementations, when a PES is 0, or there is no off-track motion during data writing to bottom track 232, the edges of bottom track 232 are approximately in a straight line. During vibration, the track edges may be wavy (depicted in FIG. 2 by dotted lines). The solid circles in FIG. 2 depict the maximum off-track location, which is approximately 50% off-track of the pitch of the top tracks 232 and 234 pitch. The disclosed technology increases the OCLIM to approximately 50%. Thus, write zero acceleration path (ZAP) fields are no longer necessary for the bottom tracks 230, 231, 233, and 235.

Figure 3:
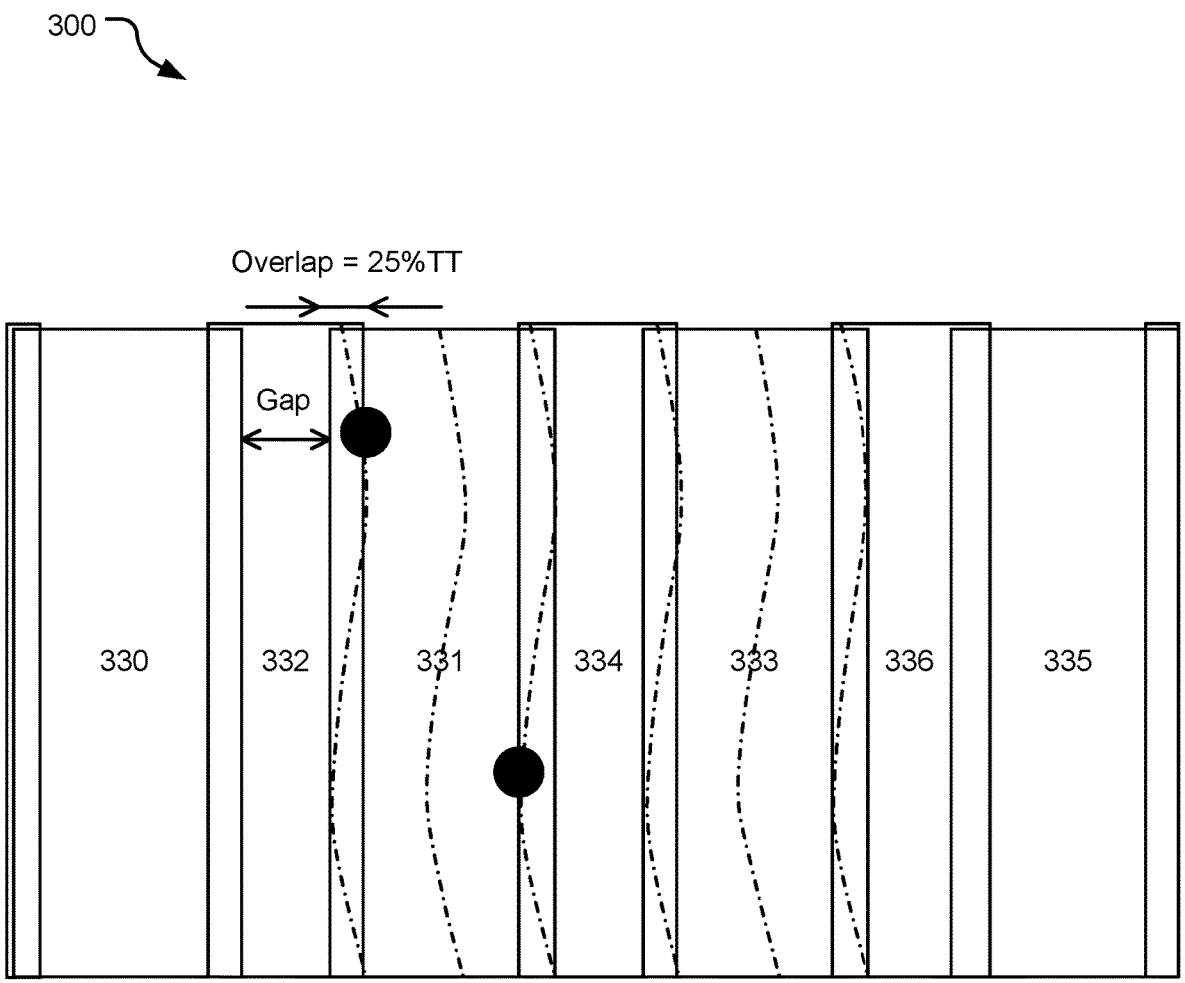
FIG. 3 is a schematic diagram of an example data tracks in an IMR storage system.

FIG. 3 is a schematic diagram of an example data tracks in an IMR storage system. The data tracks (e.g., top tracks 332, 334, and 336 and bottom tracks 330, 331, 333, and 335) are shown with an increased OCLIM on the bottom tracks.

Specifically, as depicted in FIG. 3, the OCLIM of bottom track 331 overlaps 25% of top track 332.

In some implementations, when a PES is 0, or there is no off-track motion during data writing to bottom track 332, the edges of bottom track 332 are approximately in a straight line. During vibration, the track edges may be wavy (depicted in FIG. 3 by dotted lines). The solid circles in FIG. 3 depict the maximum off-track location, which is approximately 25% off-track of the pitch of the top tracks 332 and 334 pitch. The disclosed technology increases the OCLIM to approximately 25%. Thus, write zero acceleration path (ZAP) fields are no longer necessary for the bottom tracks 330, 331, 333, and 335.

Figure 4:
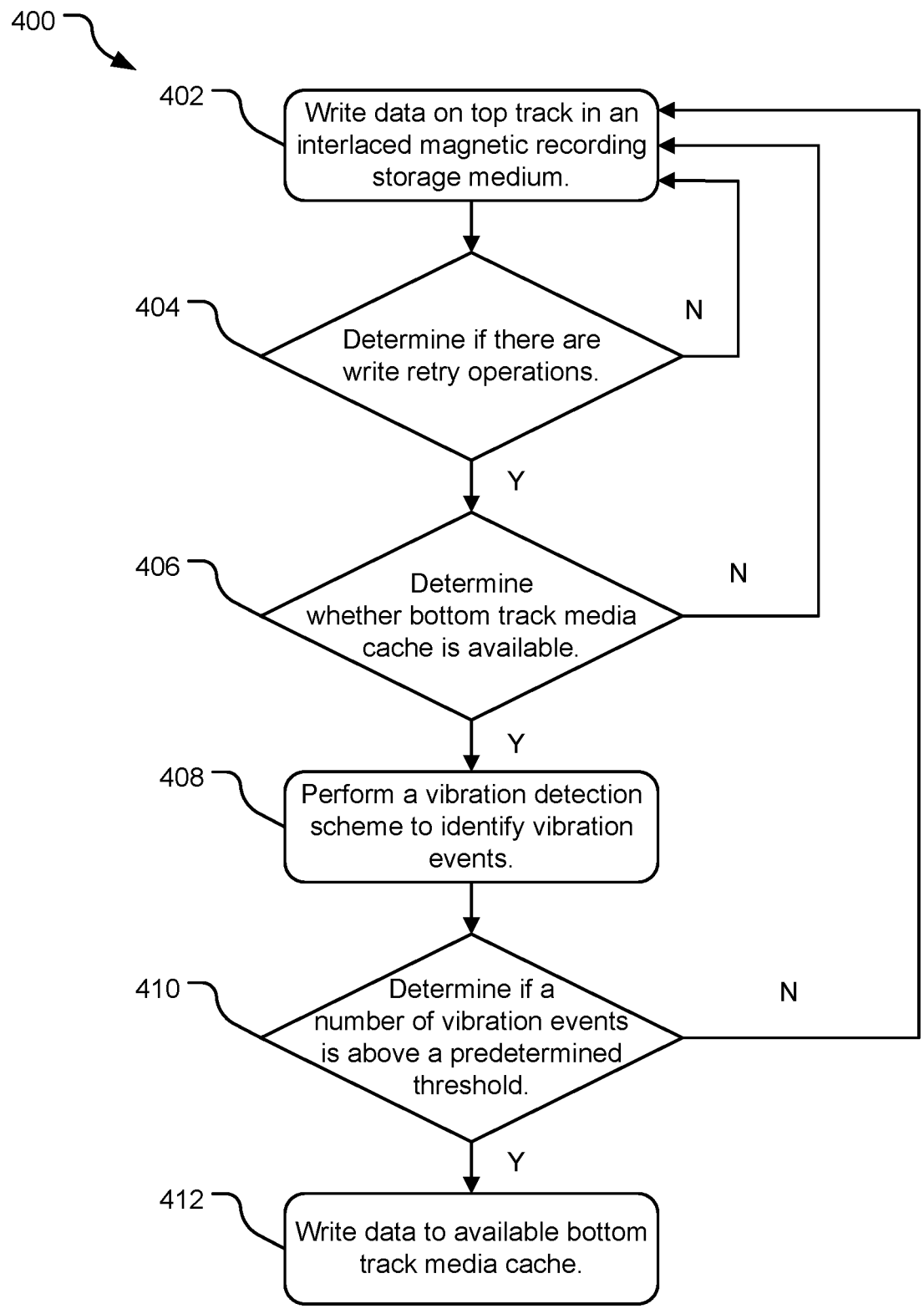
FIG. 4 is a flowchart of example operations for increasing data throughput in an in an IMR storage system.

FIG. 4 is a flowchart of example operations for increasing data throughput in an in an IMR storage system. An operation 402 writes data to top tracks of the IMR storage medium. If a disturbance occurs while data is being written to a storage medium, a write element may be knocked off of a target data track. As a result, data may be recorded incorrectly or become corrupted. Adjacent data may be protected by the OCLIM or a shock sensor to prevent data corruption during vibration. Due to the frequent projection, data throughput drops. Disturbances may be caused by a variety of forces, such as a user playing loud music from a laptop computer, vibrations due to cooling fans turning on or off, or external impact forces absorbed by an electronic device. A write operation affected by a disturbance can be retried until the write succeeds.

An operation 404 determines whether there are write retry operations indicative of disturbances. If there are no write retry operations, operation 402 continues writing data in a normal writing sequence (e.g., to a bottom track, to a top track, to a bottom track, to a top track). If write retry operations are identified, an operation 406 determines whether bottom track caching space is available responsive to determining whether there are write retry operations in the IMR storage device.

If operation 406 determines bottom track caching space is not available, operation 402 continues writing data in a normal writing sequence. If operation 406 determines bottom track caching space is available, an operation 408 performs a vibration detection scheme to identify vibration events.

An operation 410 determines if a number of vibration events is above a predetermined threshold. In some implementations, a predetermined threshold may be one or more vibration events. If operation 410 determines the number of vibration events is below a predetermined threshold, operation 402 continues writing data in a normal writing sequence.

If operation 410 determines the number of vibration events is above a predetermined threshold, an operation 412 writes data to available bottom track caching space. As a result of the disclosed method, time consuming write retry operations are reduced and data throughput performance can increase.

Figure 5:
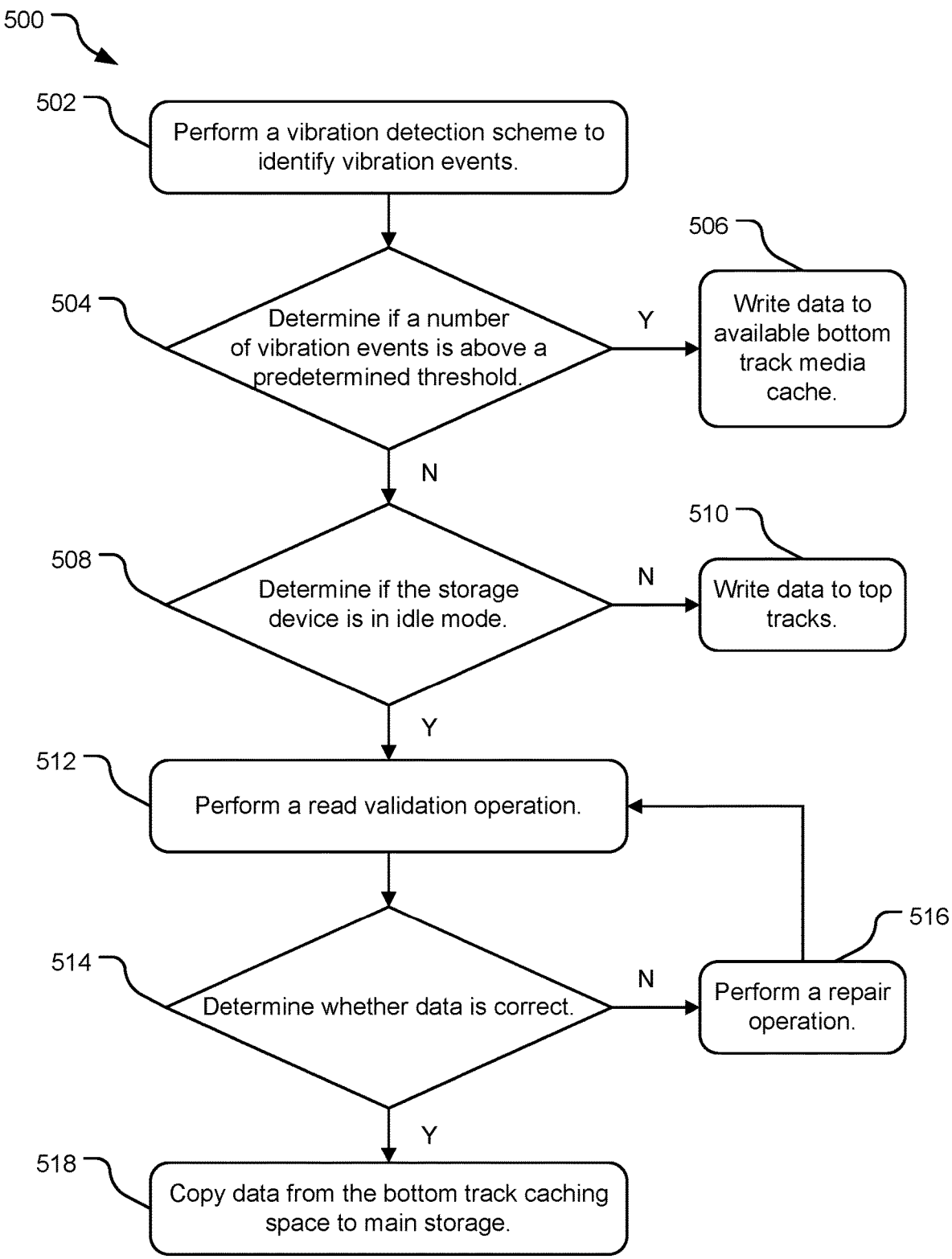
FIG. 5 is a flowchart of example operations for increasing data throughput in an in an IMR storage system.

FIG. 5 is a flowchart of example operations 500 for increasing data throughput in an in an IMR storage system. The operations 500 occur after data has been written to caching space areas in bottom tracks due to detected vibration. For example, operations 500 may occur after operation 412 in operations 400 described in detail on FIG. 4.

An operation 502 performs a vibration detection scheme to identify where there are still vibration events in the IMR storage system. An operation 504 determines if a number of vibration events are above a predetermined threshold. If the number of vibration events are above a predetermined threshold, an operation 506 writes data to available bottom track caching space (as described in detail in operation 412 in FIG. 4).

If the number of vibration events are below a predetermined threshold, an operation 508 determines if the IMR storage system is in an idle mode. If the IMR storage system is not in an idle mode, data is written to the main storage in an operation 510.

If the IMR storage system is in an idle mode, a read validation operation is performed in an operation 512. An operation 514 determines whether the data is correct. If the data is not correct, a repair operation is performed in an operation 516. If the data is correct, a data is copied from the bottom track caching space to main storage in an operation 518.

Figure 6:
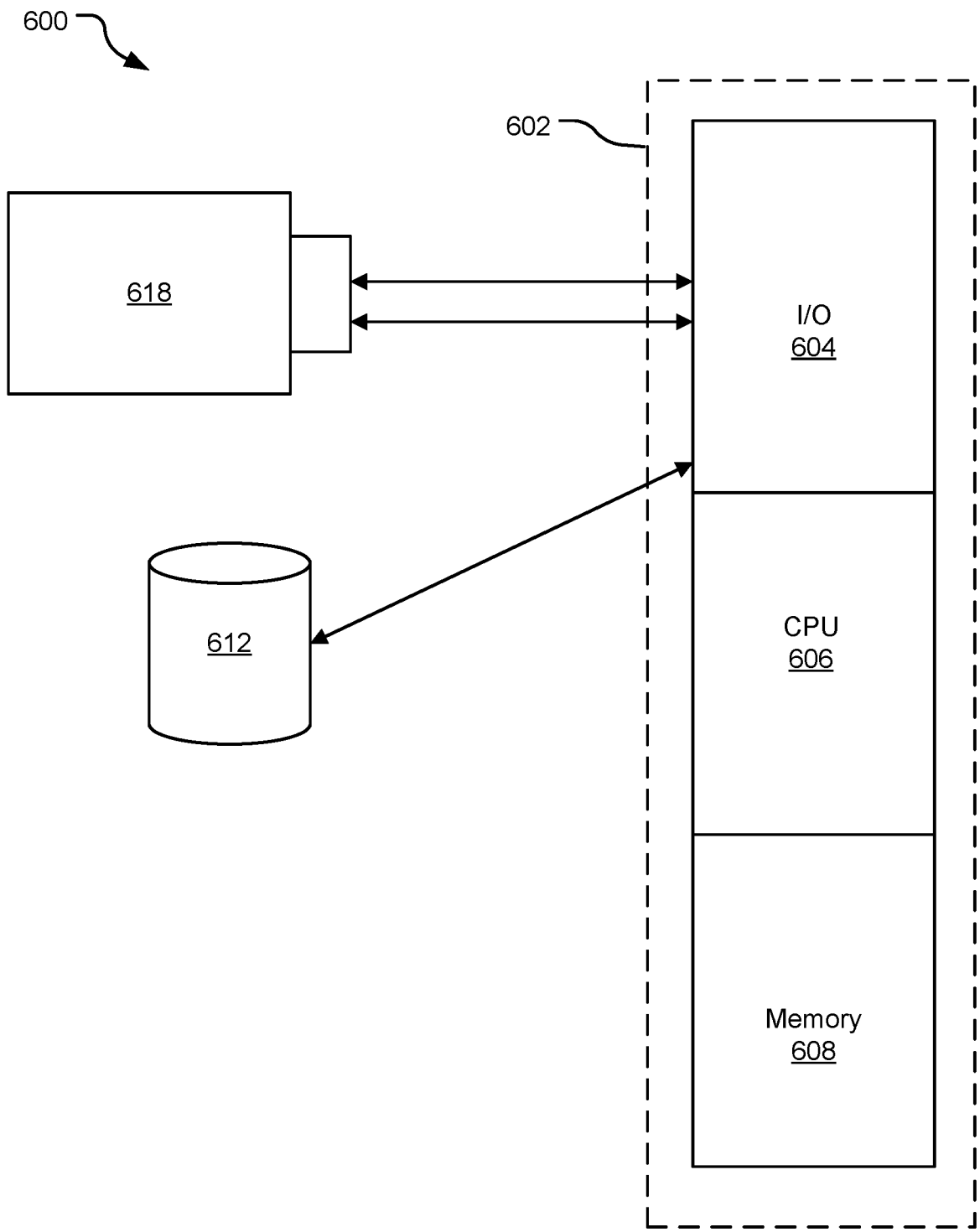
FIG. 6 is a block diagram of an example computer system suitable for implementing the technology disclosed herein.

FIG. 6 discloses a block diagram of a computer system 600 suitable for implementing the technology disclosed herein. Computer system 600 is capable of executing a computer program product embodied in a tangible computer-readable storage medium to execute a computer process. The tangible computer-readable storage medium is not embodied in a carrier-wave or other signal. Data and program files may be input to computer system 600, which reads the files and executes the programs therein using one or more processors. Some of the elements of a computer system are shown in FIG. 6, where a processor 602 is shown having an input/output (I/O) section 604, a Central Processing Unit (CPU) 606, and a memory 608. There may be one or more processors 602, such that processor 602 of system 600 has a single central-processing unit or a plurality of processing units. System 600 further includes a controller, not shown in FIG. 6, configured to designate a plurality of non-contiguous storage areas on the storage media as media scratch pads; the controller may be software, firmware, or a combination thereof. The system 600 may be a conventional computer, a distributed computer, or any other type of computer. The described technology is optionally implemented in software loaded in memory 608, a disc storage unit 612, or removable memory 618.

In an example implementation, the process of improving data throughput in IMR devices may be embodied by instructions stored in memory 608 and/or disc storage unit 612 and executed by CPU 606. Further, local computing system, remote data sources and/or services, and other associated logic represent firmware, hardware, and/or software which may be configured to adaptively distribute workload tasks to improve system performance. The disclosed methods may be implemented using a general purpose computer and specialized software (such as a server executing service software), and a special purpose computing system and specialized software (such as a mobile device or network appliance executing service software), or other computing configurations. In addition, program data, such as dynamic allocation threshold requirements and other information may be stored in memory 608 and/or disc storage unit 612 and executed by processor 602.

The implementations of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
   determining that write retry operations are performed while writing data to top tracks in a normal writing sequence on an interlaced magnetic recording (IMR) storage device;
   determining that bottom track caching space is available responsive to determining that the write retry operations were performed;
   performing a vibration detection scheme to identify vibration events responsive to determining that the bottom track caching space is available;
   determining that a number of detected vibration events is above a predetermined threshold; and
   writing data to the available bottom track caching space responsive to determining that the number of vibration events is above the predetermined threshold.

2. The method of claim 1, further comprising:
   determining that the bottom track caching space is not available; and
   continue writing data in the normal writing sequence on the IMR storage device responsive to determining that the bottom track caching space is not available.

3. The method of claim 1, further comprising:
   determining that the number of detected vibration events is below the predetermined threshold; and
   continue writing data in the normal writing sequence on the IMR storage device responsive to determining that the number of vibration events is below the predetermined threshold.

4. The method of claim 1, further comprising:
   performing another vibration detection scheme to identify additional vibration events after the data is written to the available bottom track caching space;
   determining that a number of the detected additional vibration events is above the predetermined threshold;
   determining that the IMR storage device is in an idle state responsive to determining that the number of detected additional vibration events is above the predetermined threshold; and
   performing a read validation operation to the data written to the bottom track caching space.

5. The method of claim 4, further comprising:
   determining that the data written to the bottom track caching space is correct; and
   transferring the data written to the bottom track caching space to both the top tracks and the bottom tracks of the IMR storage device in the normal writing sequence, responsive to determining that the data written to the bottom track caching space is correct.

6. The method of claim 4, further comprising:
   determining that the data written to the bottom track caching space is not correct; and
   repairing the data written to the bottom track caching space responsive to determining that the data written to the bottom track caching space is not correct.

7. The method of claim 1, wherein the on-cylinder limit of bottom tracks is approximately 25-50% of top tracks of the IMR storage device.

8. A storage device system, comprising:
   an interlaced magnetic recording (IMR) storage medium;
   a vibration sensor;
   a magnetic recording head; and
   a storage device controller configured to:
      determine that write retry operations are performed while writing data to top tracks in a normal writing sequence on the IMR storage medium;
      determine that bottom track caching space is available responsive to determining that the write retry operations were performed;
      perform a vibration detection scheme to identify vibration events using the vibration sensor responsive to determining that the bottom track caching space is available;
      determine that a number of detected vibration events is above a predetermined threshold; and
      write data to the available bottom track caching space on the IMR storage medium responsive to determining that the number of vibration events is above the predetermined threshold.

9. The storage device system of claim 8, wherein the storage controller is further configured to:
   operate the magnetic recording head to write data to alternating data tracks on the IMR storage medium, wherein at least one interlaced data track between the alternating data tracks has an on-cylinder limit that is 25-50% of the written track width of an adjacent alternating data track.

10. The storage device system of claim 8, wherein the storage controller is further configured to:

determine that the data written to the bottom track caching space is correct;

transfer the data written to the bottom track caching space to both top tracks and bottom tracks of the IMR storage medium in a normal writing sequence, responsive to determining that the data written to the bottom track caching space is correct.

11. The storage device system of claim 8, wherein the storage controller is further configured to:

determine that the data written to the bottom track caching space is not correct; and repair the data written to the bottom track caching space responsive to determining that the data written to the bottom track caching space is not correct.

12. One or more tangible computer-readable storage media encoding computer-executable instructions for executing on a computer system a computer process, the computer process comprising:

determining that write retry operations are performed while writing data to top tracks in a normal writing sequence on an interlaced magnetic recording (IMR) storage device;

determining that bottom track caching space is available responsive to determining that the write retry operations were performed;

performing a vibration detection scheme to identify vibration events responsive to determining that the bottom track caching space is available;

determining that a number of detected vibration events is above a predetermined threshold; and writing data to the available bottom track caching space responsive to determining that the number of vibration events is above the predetermined threshold.

13. The one or more tangible computer-readable storage media of claim 12, wherein the computer process further comprises:

performing another vibration detection scheme to identify additional vibration events after the data is written to the available bottom track caching space;

determining that a number of the detected additional vibration events is above the predetermined threshold;

determining that the IMR storage device is in an idle state responsive to determining that the number of detected additional vibration events is above the predetermined threshold; and performing a read validation operation to the data written to the bottom track caching space.

14. The one or more tangible computer-readable storage media of claim 12, wherein the computer process further comprises:

determining that the data written to the bottom track caching space is correct; and transferring the data written to the bottom track caching space to both top tracks and bottom tracks of the IMR storage device in a normal writing sequence, responsive to determining that the data written to the bottom track caching space is correct.

15. The one or more tangible computer-readable storage media of claim 12, wherein the computer process further comprises:

determining that the data written to the bottom track caching space is not correct; and repairing the data written to the bottom track caching space responsive to determining that the data written to the bottom track caching space is not correct.

16. The one or more tangible computer-readable storage media of claim 12, wherein the on-cylinder limit of bottom tracks is approximately 25-50% of top tracks of the IMR storage device.

* * * * *